July 25, 1944.  A. L. PARKER  2,354,538
TUBE COUPLING
Filed Sept. 27, 1940  2 Sheets-Sheet 1
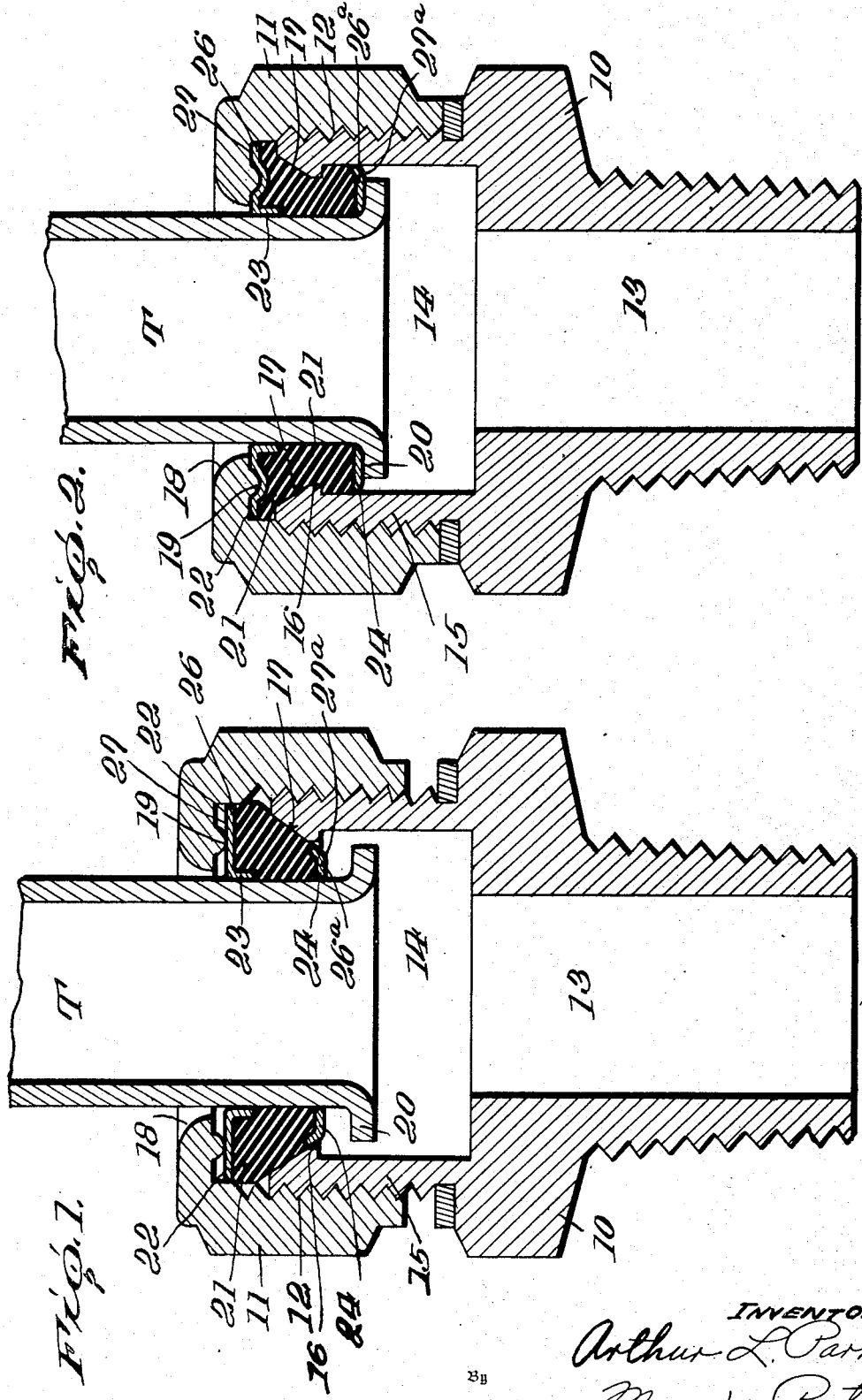
INVENTOR
Arthur L. Parker
Mason & Porter
ATTORNEYS

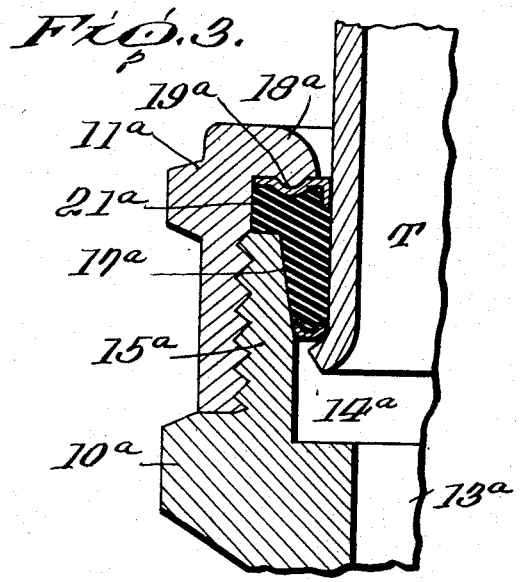
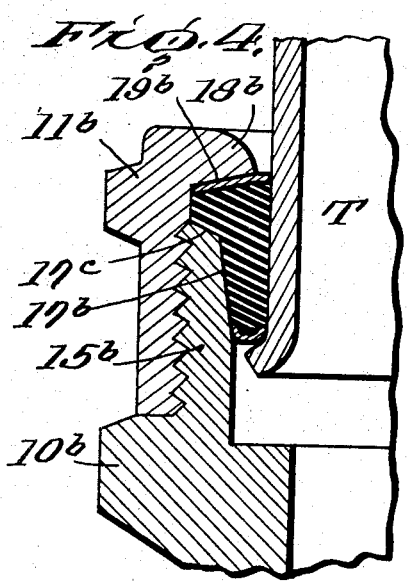
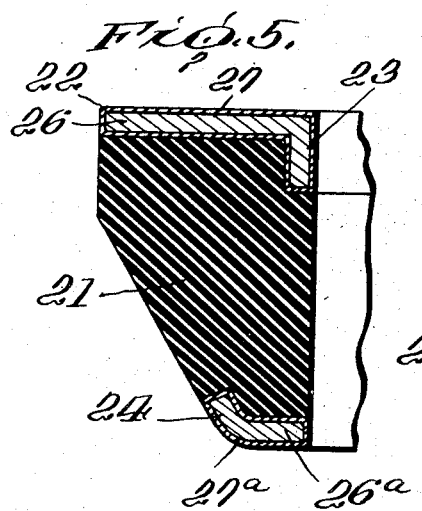
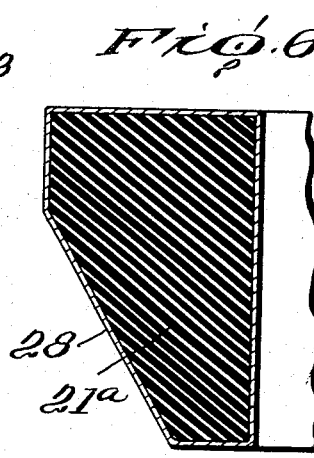
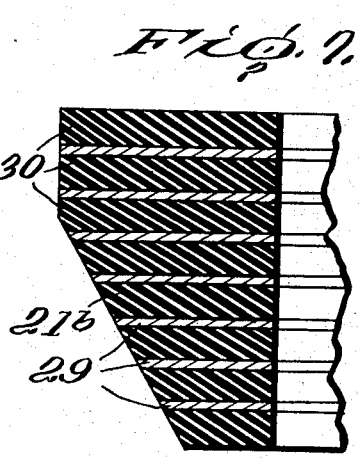

Patented July 25, 1944

2,354,538

UNITED STATES PATENT OFFICE 2,354,538

TUBE COUPLING

Arthur L. Parker, Cleveland, Ohio, assignor to The Parker Appliance Company, Cleveland, Ohio, a corporation of Ohio Application September 27, 1940, Serial No. 358,714

3 Claims. (Cl. 285—90)

The present invention relates to new and useful improvements in tube couplings, and more particularly to improvements in a coupling for flexibly and elastically clamping the end of a metal tube.

The invention relates generally to the provision of a tube or pipe coupling for flexibly and elastically securing a tube or pipe within coupling members in such a manner as to provide a fluid tight connection. The flexible and elastic connection permits the tube to shift slightly relative to the coupling members so that strains imposed on the tube will be absorbed by the elastic connection. Particularly in aircraft uses, the tube or pipe lines are subjected to excessive strains due to vibration, and failure of the tube couplings often results because of such strains. Similarly, pushing or pulling strains on the tube should be absorbed. The present invention is particularly concerned with overcoming these difficulties and the coupling includes a pair of coupling members threadedly engaging one another and an elastic packing which surrounds and directly contacts with the tube. Upon tightening of the coupling members relative to one another, the elastic packing is caused to tightly clamp the tube so as to provide an elastic and flexible, fluid tight joint.

An object of the present invention is to provide a tube coupling of the above type wherein any tendency for the elastic packing to extrude from its confining space upon tightening of the coupling members is effectively prevented.

Another object of the invention is to provide a tube coupling of the above type wherein at least the ends of the elastic packing are provided with a flexible and relatively non-stretchable material so as to prevent extrusion of the elastic packing upon tightening of the coupling members.

A further object of the invention is to provide a tube coupling of the above type wherein the elastic packing directly contacts with the tube and is otherwise substantially confined by the coupling members and wherein covering means are provided for the elastic packing in the regions between the coupling members and the tube so as to prevent extrusion of the elastic packing therebetween.

The above and other objects of the invention will in part be obvious and will be hereinafter more fully pointed out.

In the accompanying drawings:

Figure 1 is a vertical sectional view showing one form of tube coupling with the coupling members positioned prior to tightening thereof.

Figure 2 is a sectional view, similar to Figure 1, showing the positions of the parts after the coupling members have been tightened relative to one another.

Figure 3 is a vertical sectional view showing a modified form of coupling.

Figure 4 is a fragmentary vertical section showing a further modified form of coupling.

Figure 5 is an enlarged fragmentary sectional view showing one form of elastic packing member.

Figure 6 is a view, similar to Figure 5, showing a modified form of packing member.

Figure 7 is a view, similar to Figures 5 and 6, but showing a still further modified form of packing member.

Referring more in detail to the accompanying drawings, and particularly to Figures 1 and 2, the coupling is illustrated as including a male coupling member 10 and a female coupling member 11 which threadedly engage one another as at 12. The male coupling member 10 is provided with a central fluid passage 13 and an annular recessed portion 14 within the externally threaded skirt portion 15 with which the female coupling member 11 engages. An inwardly extending annular rib 16 is provided adjacent the end of the skirt portion 15 on the male coupling member and the end of the skirt portion is provided with an outwardly and upwardly tapered surface 17 above the rib 16. The female coupling member 11 is provided with an inwardly directed shoulder portion 18 which extends around the tube T but is slightly spaced therefrom. A depending annular rib portion 19 is provided on the inner surface of the shoulder 18 on the female coupling member. The inner end of the tube T is preferably provided with an outwardly flared portion 20 which is of an external diameter substantially equal to and not greater than the internal diameter of the rib 16 on the male coupling member so as to permit the tube to be inserted into the recess 14 within the skirt portion on the male coupling member.

The elastic packing 21 preferably consists of a synthetic rubber composition which is highly resistant to deterioration from contact with gasoline or other hydrocarbons. This elastic packing is non-compressible and deformable so that it can be pressed into tight engagement with the outer surface of the tube. As shown in Figure 1, the elastic packing is normally shaped before tightening of the coupling members to provide an internal cylindrical surface dimensioned so as to slip freely on to the tube before the same is flanged. The outer surface of the packing is inclined substantially symmetrical with respect to the tapered surface 17 on the end of the skirt portion of the male coupling member.

In assembling the coupling, the parts assume the position shown in Figure 1 with the outer tapered surface of the packing in contact with the tapered surface 17 on the end of the male coupling member and with the inner surface of the packing in contact with the outer surface of the tube slightly above the flared end 20 thereof. When the coupling members are tightened relative to one another the non-compressible packing is deformed and caused to firmly grip the tube as shown in Figure 2. Also, the depending rib 19 on the female coupling member becomes imbedded in the elastic packing, as does the internal annular rib 16 on the male coupling member. Similarly, the packing is forced into contact with the adjacent flared end 20 of the tube T.

In order to prevent extrusion of the elastic packing between the inner edge of the shoulder 18 on the female coupling member, there is provided a covering 22 which extends across the outer end of the elastic packing. This covering 22 is provided with a downwardly turned skirt portion 23 which preferably extends along the cylindrical inner surface of the packing and is disposed in contact with the tube. In order to prevent extrusion of the packing from between the flared end of the tube T and the inner surface of the skirt portion on the male coupling member, there is provided a covering 24 which extends across the relatively small inner end of the elastic packing. The top and bottom coverings 22 and 24 may be made of any suitable flexible but substantially non-stretchable material, such as flexible plastics, leather, fibrous materials, or plain fabric. However, as shown in Figure 5, the covering 22 preferably consists of an inner fabric filler 26 which is enclosed by a thin layer of rubber 27 and these parts may be united by vulcanizing or the like. Similarly, the covering 24 consists of an inner fabric filler 26a and a rubber covering 27a. Thus the packing is itself prevented from being extruded outwardly through the covering.

When the coupling members are tightened relative to one another so that they assume the position shown in Figure 2, the rib 19 on the shoulder 18 of the female coupling member forces the covering 22 inwardly so that it becomes imbedded in the elastic packing and this tends to prevent extrusion of the packing between the inner edge of the shoulder 18 and the tube by substantially checking the flow of the packing material in that region. Similarly, the skirt portion 23 on the covering 22 serves to prevent extrusion of the material between the tube and the inner edge of the shoulder 18. Likewise, the inwardly extending annular rib 16 around the skirt portion of the male coupling member becomes imbedded in the elastic packing and also serves to check the flow of the packing upon tightening of the coupling members. The covering 24 assumes substantially the position shown in Figure 2 and thus serves to prevent extruding of the elastic packing between the flared end of the tube and the inner surface of the skirt portion of the male coupling member.

It is to be also particularly noted that the outer edge of the flared end 20 of the tube T substantially equals the internal diameter of the rib 16 although the tube can be passed therethrough in assembling. Any tendency for the tube to be pulled outwardly of the coupling members, that is, toward the rib 16, would, if great enough, cause the lower end of the packing to be forced past the flared end of the tube although under normal conditions, the covering 24 will prevent this. However, should the strain in pulling out the tube be great enough to cause the flared end 20 of the tube to approach the rib 16, the space between the outer end of the flared portion 20 on the tube and the inner edge of the rib 16 will be so small as to prevent extrusion of the packing, thus preventing failure and leakage in the coupling.

In the modified form of the invention shown in Figure 3, the female coupling member 11a is substantially identical with the female coupling member shown in connection with Figures 1 and 2. Thus, there is provided an inwardly directed shoulder 18a which is provided with a depending rib 19a on the under surface thereof. The male coupling member 10a includes a fluid passage 13a and a recessed portion 14a within the skirt portion 15a. However, the inner surface of the skirt portion 15a is not provided with an inward rib but is merely provided with an elongated tapered surface 17a. The elastic packing 21a is substantially identical with the form of packing shown in Figures 1 and 2, and is shaped between the adjacent surfaces of the coupling members when they are tightened relative to one another so that it will assume the position shown in Figure 3. This form of the invention may be conveniently employed when it is certain that there will not be any excessive strain on the tube T tending to pull the same out of the coupling.

In the form of the invention shown in Figure 4, the male coupling member 10b is substantially the same as the male coupling member 10a shown in Figure 3. The female coupling member 11b is provided with an inwardly extending shoulder 18b which is provided with an inclined under surface 19b. The outer end of the skirt portion 15b on the male coupling member is oppositely tapered, as at 17c, with respect to the tapered under surface 19b on the shoulder 18b. This form of coupling is advantageous in that it tends to crowd the elastic packing between the tapered surface more tightly into contact with the tube.

In Figures 6 and 7, modified forms of the elastic packing are illustrated. In Figure 6, the elastic packing 21a is completely housed within the covering 28 which may be of plain fabric, as shown in Figures 1 and 2, or it may be the rubber covered type shown in Figure 5. In Figure 7, the elastic packing 21b is formed from laminated stock which may be made up of alternate layers of fabric 29 and rubber 30.

From the foregoing description, it will be seen that the present invention provides a tube coupling wherein the tube is flexibly and elastically clamped by means of an elastic packing. Upon tightening of the connected male and female coupling members relative to one another, the elastic packing is deformed into tight engagement with the tube and the coupling members do not make contact with the tube so that the tube is flexibly and elastically clamped. This type of coupling is advantageous in that the elastic packing serves as the direct holding means for the tube and also serves to absorb any strains which are set up in the tube. When the coupling members and the elastic packing are constructed and arranged in the manner described, sufficient wrench pressure can be exerted on the coupling members so as to cause the elastic packing or clamping members to firmly clamp the tube without causing the deformable packing to be extruded from the coupling members with a consequent failure of the coupling.

It is to be clearly understood that various changes in the details of construction and arrangement of parts may be made without departing from the scope of the invention as set forth in the appended claims.

I claim:

1. A coupling for tubes comprising a pair of connected coupling members, an elastic packing disposed within said coupling members and surrounding and serving to flexibly and elastically hold the tube in said coupling members, means preventing extrusion of said packing from between the tube and said coupling members during normal stresses due to vibration whereby to prevent failure of the coupling, and means providing a rib portion extending inwardly toward the tube and disposed intermediate the extremities of said packing so as to be imbedded in the packing, and the tube having an outwardly flared end maintained by the packing out of contact with the coupling members and having an external diameter substantially equal to but not greater than the internal diameter of said rib portion whereby to further prevent extrusion of the packing when the tube is subjected to excessive longitudinal pulling strains.

2. A coupling for a tube having an outwardly flared end and comprising a pair of connected coupling members, an elastic packing disposed within said coupling members and surrounding and serving to flexibly and elastically support the tube out of contact with the coupling members, a non-metallic element extending at least over portions of the packing between the tube and the coupling members for preventing extrusion of the packing, and means projecting inwardly from one of said coupling members to a point substantially aligned longitudinally with the outer edge of the flared end of the tube and imbedded in the packing intermediately of the ends thereof to limit flow thereof during tightening of the coupling members, the flared end of the tube and the inwardly projecting means cooperating to resist outward pulling of the tube.

3. A coupling for a tube having an outwardly flared end and comprising threadedly connected male and female coupling members, said female coupling member having an inwardly directed shoulder extended toward the tube, an elastic packing disposed within said coupling members between said shoulder and the flared end of the tube and surrounding and serving to flexibly and elastically support the tube out of contact with the coupling members, means providing a covering for the ends of said packing to prevent extrusion thereof, a rib on said shoulder extending toward the adjacent covering and adapted to be imbedded therein whereby to check normal tendency of the packing to flow when the coupling members are tightened relative to one another and a rib on the male coupling member extending inwardly in position to be imbedded in the packing intermediate the ends thereof whereby to check normal tendency of the packing to flow axially of the tube when the coupling members are tightened relative to one another.

ARTHUR L. PARKER.